United States Patent
Tamaki et al.

(10) Patent No.: US 7,023,617 B2
(45) Date of Patent: Apr. 4, 2006

(54) DISPLAY APPARATUS

(75) Inventors: Ryosuke Tamaki, Takarazuka (JP);
Kiyotaka Matsuura, Hirakata (JP);
Tomoki Sakamoto, Katano (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 33 days.

(21) Appl. No.: 10/118,248

(22) Filed: Apr. 9, 2002

(65) Prior Publication Data

US 2002/0149715 A1 Oct. 17, 2002

(30) Foreign Application Priority Data

Apr. 16, 2001 (JP) .............................. 2001-116567

(51) Int. Cl.
*G02B 27/26* (2006.01)
*G02F 1/1333* (2006.01)
*F21V 7/04* (2006.01)

(52) U.S. Cl. ........................ 359/462; 349/58; 362/31

(58) Field of Classification Search ................ 349/61, 349/15, 68–71; 362/31, 26; 359/462
See application file for complete search history.

(56) References Cited

U.S. PATENT DOCUMENTS

| | | | | |
|---|---|---|---|---|
| 4,965,564 A | * | 10/1990 | Fabry et al. ................ | 345/102 |
| 5,598,297 A | * | 1/1997 | Yamanaka et al. .......... | 359/462 |
| 5,691,843 A | * | 11/1997 | O'neill ........................ | 359/464 |
| 5,720,123 A | * | 2/1998 | Taylor ......................... | 40/454 |
| 5,741,058 A | * | 4/1998 | Suzuki et al. ................ | 362/27 |
| 5,852,483 A | * | 12/1998 | Newstead et al. ............ | 349/62 |
| 5,949,346 A | * | 9/1999 | Suzuki et al. .......... | 340/815.45 |
| 6,026,605 A | * | 2/2000 | Tippett ........................ | 40/725 |
| 6,315,440 B1 | * | 11/2001 | Satoh ......................... | 362/561 |
| 2003/0156077 A1 | * | 8/2003 | Balogh ......................... | 345/6 |

FOREIGN PATENT DOCUMENTS

JP 6-186913 7/1994

* cited by examiner

*Primary Examiner*—Dung T. Nguyen
*Assistant Examiner*—Mike Qi
(74) *Attorney, Agent, or Firm*—Wenderoth, Lind & Ponack, L.L.P.

(57) ABSTRACT

A display apparatus according to the present invention includes a transmission type of fluorescent display lamp (FL) 1 on which a pattern layer is not masked. The rear and front spaces of the transmission type FL 1 are defined by frames 5, 6. On each frame 5, 6 is attached an illumination display member, such as a light guide plate 8 or a transmission sheet 9, so that illumination displays are provided at both front and rear sides of the FL 1 by a light emitting source 10 such as an LED, fluorescent lamp and so on. Thus, a greater three-dimensional visual effect (depth perception) can be obtained. Further, by utilizing spaces in the front and the rear of the transmission type FL 1, a wider representation and functional display through a microcomputer control can be performed. Use of the light emitting source 10 lowers cost in comparison with the conventional biplanar type of FL.

16 Claims, 5 Drawing Sheets

DISPLAY APPARATUS

BACKGROUND OF THE INVENTION

The present invention relates to a display apparatus, and particularly to a display apparatus comprising a combination of a transmission type of display element such as a fluorescent display lamp (hereinafter, referred to as FL) and an illumination display, obtaining a three-dimensional visual effect and performing a functional display through a microcomputer control.

FIG. 7 shows a front view of a conventional display apparatus using a biplanar type of FL 1, and FIG. 8 shows a sectional view of the apparatus. As shown in FIG. 8, the biplanar type of FL comprises two pattern layers, i.e., a front pattern layer 7 and a rear pattern layer 13 between which a space is defined. Each pattern layer provides a different display to obtain a three-dimensional visual effect. Through only electrodes connected to the rear pattern layer 13, the fluorescent substances printed on both pattern layers 7 and 13 are energized to generate light. In order to keep the brightness of the pattern layers 7 and 13 at the same level, the size of the space between the pattern layers 7 and 13 must be substantially 3 mm wide. The front pattern layer 7 is a transmission type (i.e., transmissive) pattern layer, while the rear pattern layer 13 is opaque in order to make the elements on the substrate invisible. As shown in FIG. 7, in the case of showing a speaker arrangement for audio equipment, because of the limitations concerning the pattern on the FL 1, the size of the speaker arrangement to be displayed is limited. Even though both the center speaker display 2 and the front speaker display 3 are provided by the rear pattern layer 13 and the rear speaker display 4 is performed by the front pattern layer 7, depth perception is not sufficient since the width of the space between the pattern layers 7 and 13 is only about 3 mm.

Thus, in the conventional biplanar type of FL 1, since the space between pattern layers is only substantially 3 mm wide and the depth perception is less, a minimal three-dimensional visual effect can be obtained. Though a functional display can be provided via a microcomputer control, the display is limited within the FL 1, which restricts the content and size of the display. In addition, the cost considerably increases in comparison with a typical single layer type of FL.

SUMMARY OF THE INVENTION

The present invention has been developed to substantially eliminate the above-described disadvantages.

It is therefore an object of the present invention to provide a display apparatus which can have greater depth perception than the biplanar type of FL by utilizing non-limiting spaces in the front and the rear of the FL and can provide a wide representation.

It is an another object of the present invention to provide a display apparatus which comprises a combination of an FL display and an illumination display to perform a functional display through a microcomputer control.

It is still another object of the present invention to provide a display apparatus at a lower cost.

In order to attain the aforementioned objects, there is provided a display apparatus, comprising: a transmission type of (transmissive) display element; a first frame for defining a front space positioned at the front of the transmission type of display element; a second frame for defining a rear space positioned at the rear of the transmission type of display element; an illumination display member attached to the face of the first frame or the second frame; and a light emitting source for irradiating light to the illumination display member.

Thus, according to the present invention, a greater three-dimensional visual effect (depth perception) can be obtained. Further, utilizing spaces in the front and the rear of the transmission type FL, a wider representation and functional display through a microcomputer control can be performed. Use of the light emitting source such as LED, fluorescent lamp and so on lowers cost in comparison with the conventional biplanar type of FL.

Preferably, the display element may comprise one selected from the group consisting of a fluorescent display lamp, an electroluminescence, and a liquid crystal display.

The first frame may have a rectangular shape comprising upper and lower walls and both side walls, while the second frame may have a rectangular box shape comprising upper and lower walls, both side walls and a back wall.

The illumination display member may have a predetermined display printed thereon.

The illumination display member may comprise a transmission (transmissive) sheet or a light guide plate. The transmission sheet may be colored with a predetermined color.

The light emitting source may comprise a light emitting diode.

BRIEF DESCRIPTION OF THE DRAWINGS

Further objects and advantages of the present invention will become clear from the following description taken in conjunction with the preferred embodiments thereof with reference to the accompanying drawings, in which.

DETAILED DESCRIPTION OF THE PREFERRED EMBODIMENTS

First Embodiment

Figure 1:
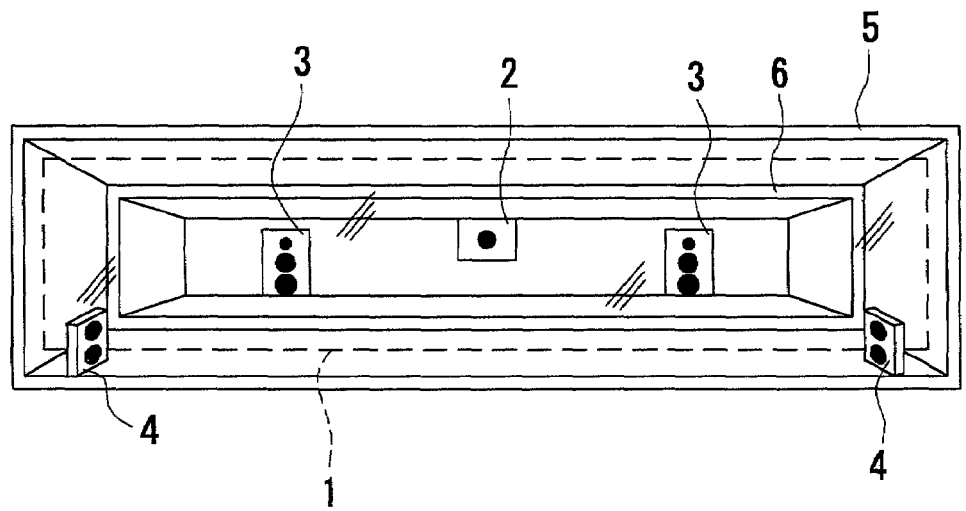
FIG. 1 is a front view of a display apparatus for audio equipment according to a first embodiment of the present invention, which can display a speaker arrangement as an example of the display.
Figure 2:
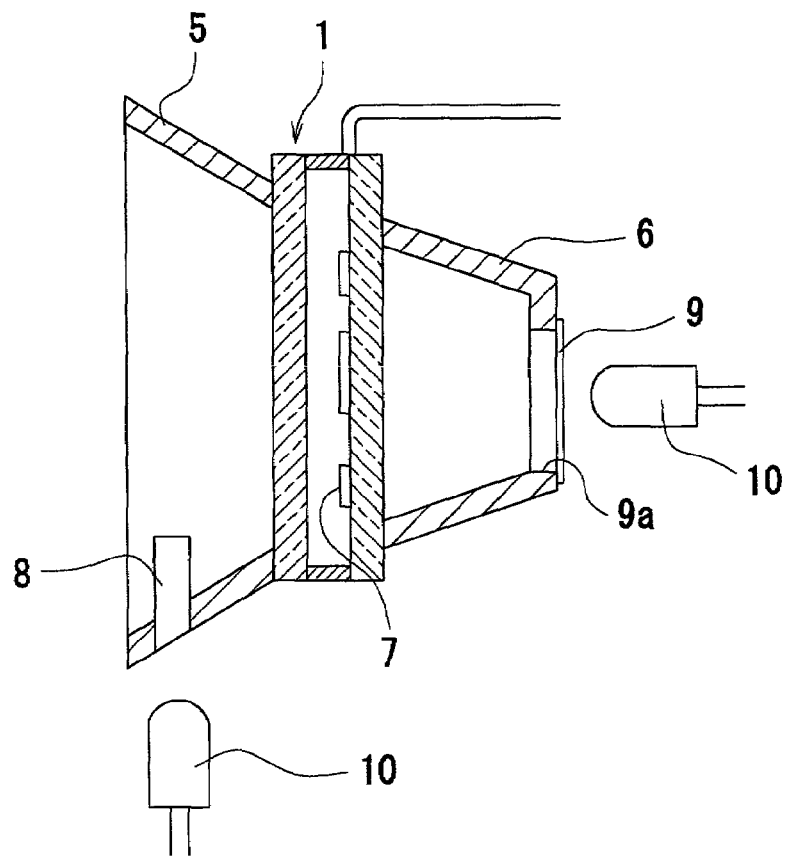
FIG. 2 is a sectional view of FIG. 1.

In the first embodiment of the present invention, a display apparatus for audio equipment, which can display a speaker arrangement as an example of the display, will be explained. FIG. 1 is a front view of the display apparatus in the first embodiment of the present invention, and FIG. 2 is a sectional view thereof.

Numeral 1 denotes a transmission type of fluorescent display lamp (FL) having pattern layers 7. At the front side and the rear side (opposite the front side, as illustrated in FIG. 2) of the FL 1, a first frame 5 and a second frame 6 are provided, respectively. The first frame 5 has a rectangular shape comprising upper and lower walls and both side walls to define a front space at the front of the FL 1. The second frame 6 has a rectangular box shape comprising upper and lower walls, both side walls, and a back wall to define a rear space at the rear of the FL 1.

On the lower wall of the first frame 5 are attached light guide plates (illumination display members) 8 and a rear speaker display 4 is printed on each of the light guide plates. On the back wall of the second frame 6 three openings 9a are formed. The openings 9a are covered with transmission sheets (illumination display members) 9 on which a center speaker display 2 and front speaker displays 3 are printed, respectively. As illustrated in FIG. 2, the illumination display members 8, 9 are spaced apart from the transmissive display element 1 (i.e., a gap exists between the forward/rear illumination display members 8/9 and the transmissive display element 1). Adjacent to the light guide plates 8 and the transmission sheets 9, there are light emitting sources 10 such as an LED and so on for irradiating light to the speaker displays 2, 3, 4 of the light guide plates 8 and the transmission (transmissive) sheet 9. Alternatively, the rear speaker display 4 may be provided not by the light guide plates 8, but by transmission sheets similar to those on which rear speaker displays are printed and which are attached on the left and right walls of the first frame 5. As is clear from the description of the invention provided herein, the phrase "illumination display member" means an object or image to be illuminated, and several specific examples have been described (although the invention is of course not limited to these examples).

Turning the LED 10 on, light is irradiated to the light guide plates 8 and the transmission sheets 9, respectively. Thus, the rear speaker displays 4 are illuminated at the front of the FL 1 and the center and front speaker displays 2 and 3 are illuminated at the rear of the FL 1, obtaining a three-dimensional visual effect. Due to the microcomputer control, a functional display can be provided. For example, the display of the FL 1 and the speaker displays provided by the illumination display members can be combined to illuminate only the speakers which are presently operating.

Second Embodiment

In the following second and third embodiments, the same numerals are used to indicate the same parts as those in the first embodiment to omit the explanation thereof.

Figure 3:
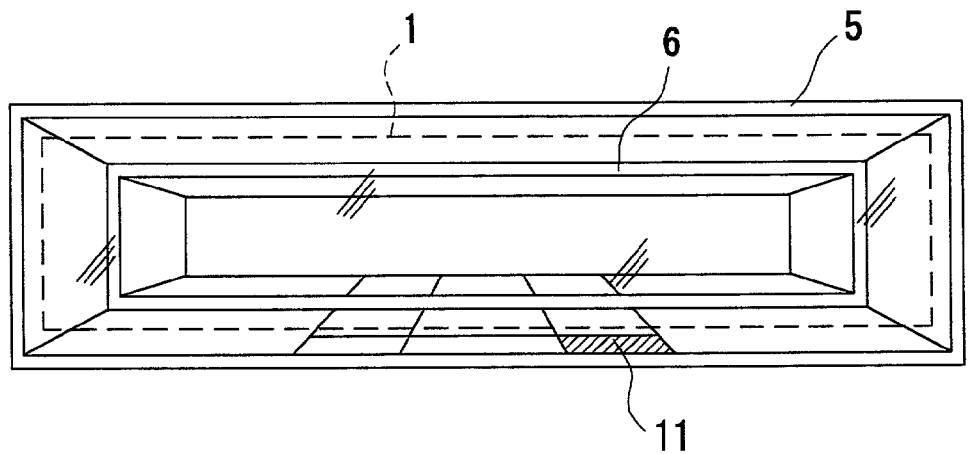
FIG. 3 is a front view of a display apparatus for audio equipment according to a second embodiment of the present invention, which can display a seat position as an example of the display.
Figure 4:
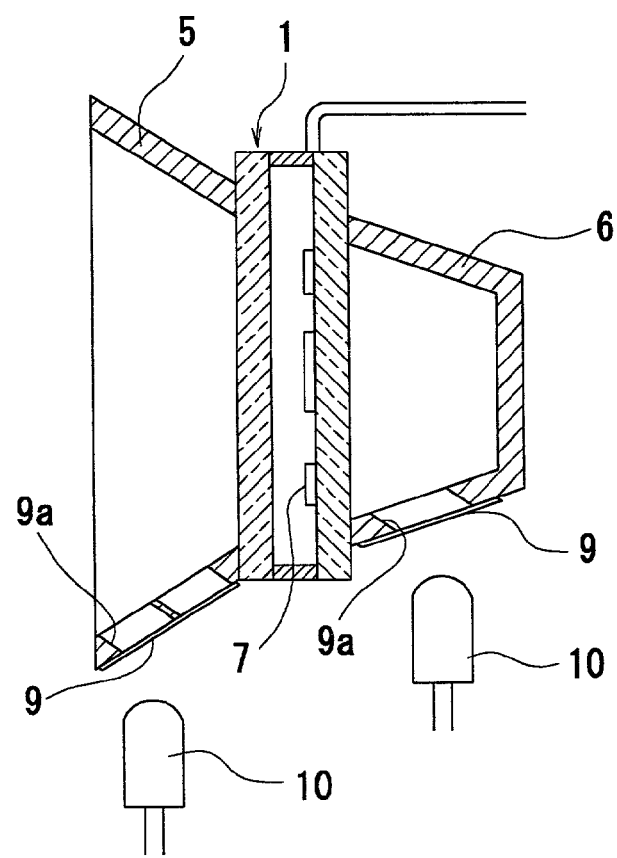
FIG. 4 is a sectional view of FIG. 3.

In the second embodiment of the present invention, a display apparatus for audio equipment which can display a seat position indicating a selected listener's position as an example of the display will be explained. The seat position is important because the sound from the speaker is adjusted based on the listener's position to provide an optimum sound field at the listener's position and at the same time one of a plurality of square areas divided on the FL 1 is blinked to show the listener's position. FIG. 3 is a front view of the display apparatus in the second embodiment of the present invention and FIG. 4 is a sectional view thereof.

On the lower walls of the first frame 5 and the second frame 6 are formed a total of nine openings 9a in a manner of a lattice window. The openings 9a are covered with transmission sheets (illumination display members) 9 which are colored with an appropriate color. Adjacent to the transmission sheets 9, light emitting sources 10 such as an LED and so on for irradiating light to the transmission sheets 9 are disposed.

Turning the LED 10 on, light is irradiated to the transmission sheet 9 corresponding to the selected listener's position. Thus, the seat position displays 11 are illuminated either in the front or the rear of the FL 1, providing a three-dimensional visual effect. Due to the microcomputer control, functional display, for example, can also be performed to illuminate the seat position which matches with the sound field.

Third Embodiment

Figure 5:
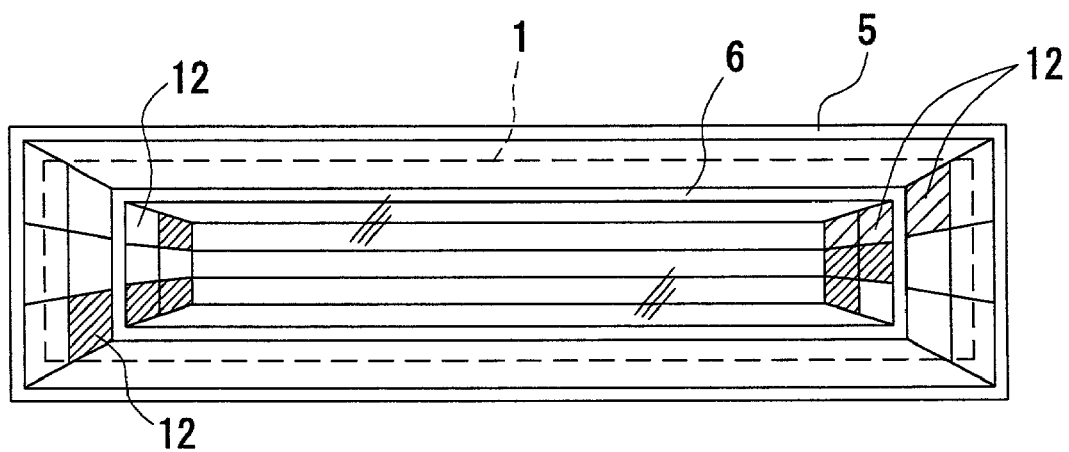
FIG. 5 is a front view of a display apparatus for audio equipment according to a third embodiment of the present invention, which can display a graphic as an example of the display.
Figure 6:
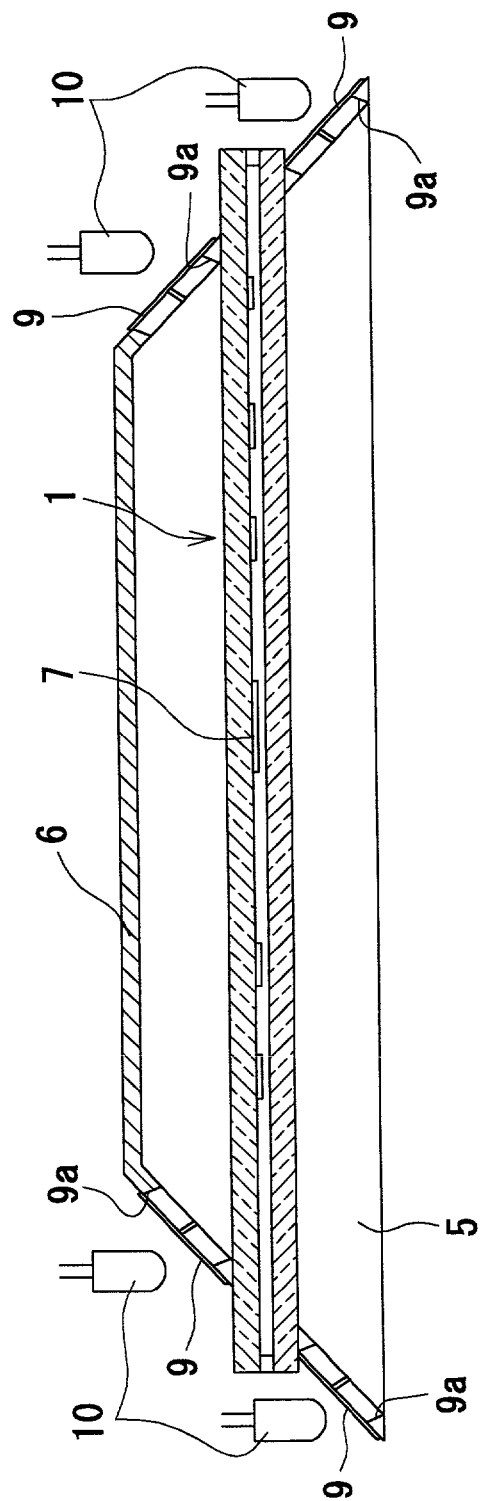
FIG. 6 is a sectional view of FIG. 5.
Figure 7:
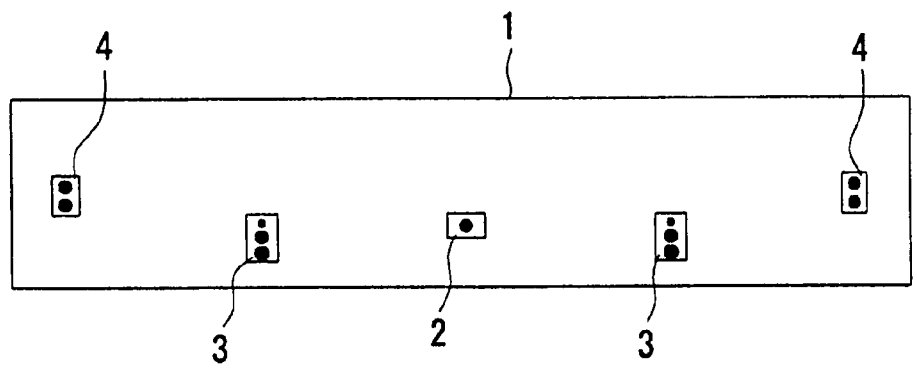
FIG. 7 is a front view of a display apparatus using a conventional biplanar type of FL.
Figure 8:
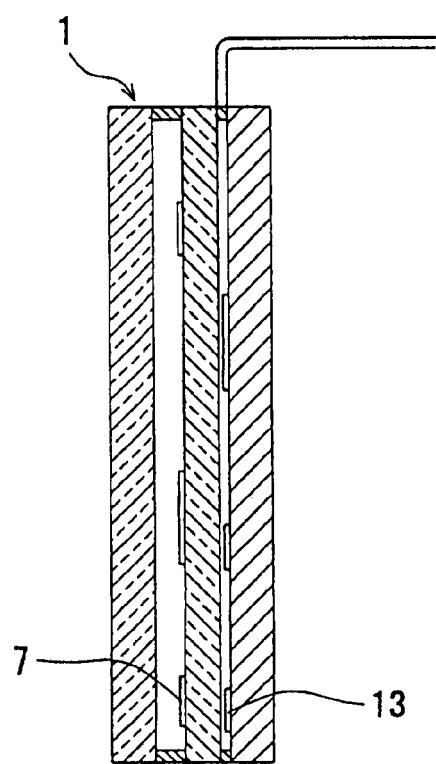
FIG. 8 is a sectional view of FIG. 7.

In the third embodiment of the present invention, a display apparatus of an audio equipment which can display a graphic as an example of a display will be explained. FIG. 5 is a front view of the display apparatus in the third embodiment of the present invention and FIG. 6 is a sectional view thereof.

On the left and right side walls (alternatively, the upper and lower walls) of the first frame 5 and the second frame 6 are formed a total of twelve openings 9a in a manner of a lattice window. The openings 9a are covered with transmission sheets (illumination display members) 9 which are colored with an appropriate color. Adjacent to the transmission sheets 9, light emitting sources 10 such as an LED and so on are provided for irradiating light to the transmission sheets 9.

Turning the LED 10 on, light is irradiated to the transmission sheets 9, respectively. Thus, the graphic displays 12 using the walls of the first and second frames 5, 6 are provided in both the front and the rear of the FL 1, obtaining a three-dimensional visual effect. Due to microcomputer control, the display apparatus can be used to display sound levels and blink the displays based on the rhythm. Further, it can also be used to combine the display of the FL 1 and not only the graphic displays 12 but also the speaker arrangements 2, 3, 4 and the seat position displays 11 provided by the illumination display members to provide a multifunction display having a three-dimensional visual effect.

In the aforementioned first, second and third embodiments, although a transmission type of FL is used as the transmission type display element, the present invention is not limited to the transmission type of FL. As examples of the transmission type element, EL (electroluminescence) display, LCD (a liquid crystal display) and so on may also be used.

Although the present invention has been fully described by way of the examples with reference to the accompanying drawings, it is to be noted that various changes and modifications will be apparent to those skilled in the art. Therefore, unless such changes and modifications otherwise depart from the spirit and scope of the present invention, they should be construed as being included therein.

What is claimed is:

1. A display apparatus comprising:
    a transmissive display element comprising one of a fluorescent display lamp, an electroluminescence display, and a liquid crystal display;
    a first frame at the front of said transmissive display element and shaped to define a front space;
    a second frame at the rear of said transmissive display element and shaped to define a rear space;
    a first illumination display member attached to said first frame so as to be located at the front of said transmissive display element;
    a second illumination display member attached to said second frame so as to be located at the rear of said transmissive display element and visible through said transmissive display element from the front of said display apparatus;

a light emitting source for irradiating light to said first illumination display member and said second illumination display member so that both said first illumination display member and said second illumination display member are illuminated at the front of and at the rear of said transmissive display element, respectively, to obtain a three-dimensional visual effect.

2. The display apparatus of claim 1, wherein said first frame has a rectangular shape including an upper wall, a lower wall, a first side wall, and a second side wall.

3. The display apparatus of claim 1, wherein said second frame has a rectangular box shape including an upper wall, a lower wall, a first side wall, a second side wall, and a back wall.

4. The display apparatus of claim 1, wherein each of said first illumination display member and said second illumination display member has a predetermined display printed thereon.

5. The display apparatus of claim 1, wherein said second illumination display member comprises a transmissive sheet.

6. The display apparatus of claim 5, wherein said transmissive sheet has a predetermined color.

7. The display apparatus of claim 1, wherein said first illumination display member comprises a light guide plate.

8. The display apparatus of claim 1, wherein said light emitting source comprises a light emitting diode.

9. The display apparatus of claim 1, wherein said first illumination display member comprises a first type of illumination display member, said second illumination display member comprising a second type of illumination display member different than said first type of illumination display member.

10. The display apparatus of claim 9, wherein said second type of illumination display member comprises a transmissive sheet, and said first type of illumination display member comprises a light guide plate.

11. The display apparatus of claim 10, wherein said light guide plate is directly attached to said first frame, and said transmissive sheet is directly attached to said second frame.

12. The display apparatus of claim 1, wherein said first illumination display member comprises one of a plurality of first illumination display members attached to said first frame, and said second illumination display member comprises one of a plurality of second illumination display members attached to said second frame.

13. The display apparatus of claim 12, wherein each of said second illumination display members comprises a transmissive sheet attached to said second frame.

14. The display apparatus of claim 1, wherein said first illumination display member is attached to said first frame so as to be spaced apart from said transmissive display element at the front of said transmissive display element.

15. The display apparatus of claim 14, wherein said second illumination display member is attached to said second frame so as to be spaced apart from said transmissive display element at the rear of said transmissive display element.

16. The display apparatus of claim 1, wherein said second illumination display member is attached to said second frame so as to be spaced apart from said transmissive display element at the rear of said transmissive display element.

* * * * *